(12) United States Patent
Zhang et al.

(10) Patent No.: US 9,052,435 B2
(45) Date of Patent: Jun. 9, 2015

(54) BENDING-RESISTANT LARGE CORE DIAMETER HIGH NUMERICAL APERTURE MULTIMODE FIBER

(75) Inventors: Shuqiang Zhang, Hubei (CN); Yongtao Liu, Hubei (CN); Song Wang, Hubei (CN); Zhenbao He, Hubei (CN); Jin Xu, Hubei (CN)

(73) Assignee: EVERPRO TECHNOLOGIES COMPANY LTD., Wuhan, Hubei (CN)

( * ) Notice: Subject to any disclaimer, the term of this patent is extended or adjusted under 35 U.S.C. 154(b) by 86 days.

(21) Appl. No.: 13/997,950

(22) PCT Filed: Mar. 13, 2012

(86) PCT No.: PCT/CN2012/072221
§ 371 (c)(1),
(2), (4) Date: Jun. 25, 2013

(87) PCT Pub. No.: WO2013/000291
PCT Pub. Date: Jan. 3, 2013

(65) Prior Publication Data
US 2013/0279868 A1  Oct. 24, 2013

(30) Foreign Application Priority Data
Jun. 28, 2011 (CN) .......................... 2011 1 0178288

(51) Int. Cl.
G02B 6/036  (2006.01)
G02B 6/028  (2006.01)
G02B 6/02   (2006.01)

(52) U.S. Cl.
CPC .......... *G02B 6/03627* (2013.01); *G02B 6/0288* (2013.01); *G02B 6/0365* (2013.01); *G02B 6/02* (2013.01)

(58) Field of Classification Search
CPC ........................ G02B 6/03627; G02B 6/0365
See application file for complete search history.

(56) References Cited

U.S. PATENT DOCUMENTS

| 7,903,918 B1 | 3/2011 | Bickham et al. |
| 2009/0169163 A1 | 7/2009 | Abbott, III et al. |
| 2011/0002590 A1 | 1/2011 | Ooizumi et al. |

FOREIGN PATENT DOCUMENTS

| CN | 101622561 A | 1/2010 |
| CN | 101732961 A | 6/2010 |
| CN | 101738681 A | 6/2010 |
| CN | 101738683 A | 6/2010 |

(Continued)

OTHER PUBLICATIONS

State Intellectual Property Office of the People's Republic of China, "Office Action", China, Apr. 20, 2012.

(Continued)

*Primary Examiner* — Jerry Rahll
(74) *Attorney, Agent, or Firm* — Tim Tingkang Xia, Esq.; Morris, Manning & Martin, LLP

(57) ABSTRACT

A bending-resistant large core diameter high numerical aperture multimode fiber includes a core and a cladding surrounding the core. The core has a radius R1 in a range of 28 to 50 microns, a refractive index profile of a parabola shape with α being in a range of 1.9 to 2.2, and a maximum relative refractive index difference Δ1% max being in a range of 1.9% to 2.5%. The cladding includes an inner cladding and/or a trench cladding, and an outer cladding disposed from the inner to the outer in sequence. The radius R2 of the inner cladding is in a range of 28 to 55 microns, and the relative refractive index difference Δ2% is −0.1% to 0.1%. The radius R3 of the trench cladding is in a range of 28 to 60 microns, and the relative refractive index difference Δ3% is in a range of −0.15% to −0.8%.

14 Claims, 2 Drawing Sheets

(56) References Cited

FOREIGN PATENT DOCUMENTS

| CN | 102193142 A | 9/2011 |
|---|---|---|
| WO | 2010036684 A2 | 4/2010 |

OTHER PUBLICATIONS

State Intellectual Property Office of the People's Republic of China, "Office Action", China, Sep. 24, 2012.
State Intellectual Property Office of the People's Republic of China, "Office Action", China, Dec. 25, 2012.

BENDING-RESISTANT LARGE CORE DIAMETER HIGH NUMERICAL APERTURE MULTIMODE FIBER

FIELD OF THE INVENTION

The present invention relates generally to optical data transmission, and more particularly to a bending-resistant large core diameter high numerical aperture multimode fiber that can be utilized in data transmission and optical devices. The fiber has not only desirable bending resistance performance and a feature of easy coupling to a light-emitting diode (LED) light source, but also a very high bandwidth.

BACKGROUND OF THE INVENTION

Fibers enter a practical stage as multimode fibers emerge. In recent years, for single-mode fibers, new varieties continue to emerge, functions are increasingly enriched and enhanced, and the cost performance continues to improve, but multimode fibers cannot be replaced and still maintain a stable market share. The reason is that a multimode fiber has many features satisfying requirements on a local area network (LAN) fiber that the single-mode fiber does not have.

Compared with a long-distance trunk, a LAN fiber network has the following features: the transmission rate is relatively lower; the transmission distance is relatively shorter; but the numbers of nodes, connecting points, bent paths, and connectors and couplers used are large, the overall scale of use is small, and the number of light sources consumed per unit distance of fiber is large. The low transmission rate and the short transmission distance may be addressed with bandwidth features of the multimode fibers and the feature that transmission losses of the multimode fibers are less than that of the single-mode fibers. The single-mode fibers are cheaper, and have better performance than the multimode fibers, but why the single-mode fibers are not used in an access network? The reason is that in this type of networks, the number of bent paths is large and the loss is large; the large number of nodes results in frequent optical power division, which requires that the interiors of the fibers have sufficient optical power transmissions. Compared with the single-mode fiber, the multimode fiber has a larger core diameter and a larger numerical aperture, and can couple more optical power from a light source. In a network, the number of consumed connectors and couplers is large. Unusually, passive devices of the single-mode fibers are more expensive than that of multimode fibers, are also more delicate, but are not as convenient and reliable as multimode devices during operation. A more important difference lies in that the single-mode fibers can only use a laser diode (LD) as a light source, and the LD is much more expensive than an LED usually used by the multimode fiber. Especially, for a LAN, the network size is small, and when the number of light sources consumed per unit distance of fibers is large, if the single-mode fibers are still used in combination with single-mode fiber LDs, the cost of the LDs becomes the major part of the overall cost of the network. Therefore, although the single-mode fibers are cheaper than the multimode fibers, the high prices of the LDs and the connectors that are the major part of the cost still dramatically increase the overall cost.

According to the standards recommended by international standards organizations such as the IEC and the ITU, conventional multimode fibers may be classified into two categories, namely 50 μm and 62.5 μm. The 50 μm category may be further classified into OM2, OM3, and OM4 types, according to the bandwidths. Light gathering capability of the fibers is indicated by the numerical aperture of the fibers. Normally, the numerical aperture of a 50 μm multimode fiber is 0.20, while the numerical aperture of a 62.5 μm multimode fiber is 0.27. Recently, in order to meet requirements of access network applications and data centers on fiber bending radius, bending resistance performances of the conventional multimode fibers have been improved, thereby resulting in bending-resistant OM3 and OM4 fibers. However, the existing multimode fibers still cannot fully meet high bandwidth requirements of data transmissions.

Therefore, a heretofore unaddressed need exists in the art to address the aforementioned deficiencies and inadequacies.

SUMMARY OF THE INVENTION

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. It will be appreciated that the same thing can be said in more than one way. Consequently, alternative language and synonyms may be used for any one or more of the terms discussed herein, nor is any special significance to be placed upon whether or not a term is elaborated or discussed herein.

As used herein, the term "a quartz liner tube" refers to a tubular base tube having an inner wall bearing glass state oxidized deposits resulting from a plasma-enhanced chemical vapor deposition (PCVD) chemical reaction.

As used herein, the term "a core" refers to a central part of a fiber which is located in a central area of a cross section of the fiber, and is a major light guide region of the fiber.

As used herein, the term "an inner cladding" refers to an annular inner layer of the fiber immediately surrounding the core of the fiber, and is corresponding to an annular area immediately surrounding the core in the fiber cross section.

As used herein, the term "a trench cladding" refers to an annular inner layer immediately surrounding the inner cladding of the fiber, and is corresponding to an annular area immediately surrounding the inner cladding in the fiber cross section.

As used herein, the term "an outer cladding" refers to an outer annular layer immediately surrounding the trench cladding of the fiber, and is corresponding to an annular area immediately surrounding the trench cladding in the fiber cross section.

As used herein, the term "a relative refractive index difference" refers to the following formula:

$$\Delta\% = \left[\frac{(n_i^2 - n_0^2)}{2n_i^2}\right] \times 100\% \approx \frac{n_i - n_0}{n_0} \times 100\%$$

where $n_i$ and $n_0$ are respectively a refractive index of a corresponding part of the fiber and of pure silica glass at a wavelength of about 850 nm.

As used herein, the term "exponent refractive index distribution profile" or "α-profile" refers to a refractive index distribution of a fiber which stratifies with the following exponent function:

$$n^2(r) = n_1^2 \left[1 - 2\Delta\left(\frac{r}{a}\right)^\alpha\right] \quad r < a.$$

where $n_1$ is a refractive index at the central axis of the fiber, and r is a distance from the central axis of the fiber; a is the radius of the core of the fiber; $\alpha$ is an exponent; $\Delta$ is a core/cladding relative refractive index difference.

According to the invention, one of the objectives is to provide a bending-resistant large core diameter high numerical aperture multimode fiber that has not only a high bandwidth and a large numerical aperture, but also desirable bending resistance performance and a feature of easy coupling to an LED light source.

The technical solution adopted by the invention is discussed as follows.

A bending-resistant multimode fiber with a large core diameter and a high numerical aperture includes a core and a cladding surrounding the core, where a radius R1 of the core is in a range of 28 to 50 microns, a refractive index profile of the core has a parabolic shape, $\alpha$ is in a range of 1.9 to 2.2, and a maximum relative refractive index difference $\Delta 1\%$ max is in a range of 1.9% to 2.5%. The cladding comprises an inner cladding and/or a trench cladding, and an outer cladding disposed from the inner to the outer in sequence, where the inner cladding has a radius R2 in a range of 28 to 55 microns, and a relative refractive index difference $\Delta 2\%$ in a range of −0.1% to 0.1%, and the trench cladding has a radius R3 in a range of 28 to 60 microns, and a relative refractive index difference $\Delta 3\%$ in a range of −0.15% to −0.8%.

In one embodiment, the outer cladding surrounds the trench cladding, where a radius R4 of the outer cladding is in a range of 60 to 65 microns, and a relative refractive index difference $\Delta 4\%$ of the outer cladding is in a range of −0.1% to 0.1%.

In one embodiment, the relative refractive index difference $\Delta 3\%$ of the trench cladding is radially constant or radially gradual changed, wherein the gradual change of the relative refractive index difference $\Delta 3\%$ comprises a gradual change in an ascending order from inside to outside or a gradual change in a descending order from inside to outside.

In one embodiment, the core and the claddings are made of Ge-doped or F-doped or Ge—F-doped or pure quartz glass.

In one embodiment, material components of the Ge—F-doped quartz glass are $SiO_2$—$GeO_2$—F—Cl; and material components of the F-doped quartz glass are $SiO_2$—F—Cl.

In one embodiment, Cl is introduced through Cl resulting from the reaction between $SiCl_4$, $GeCl_4$, and $O_2$, the fluctuation of the Cl content does not affect the performance of the fiber much, and the fluctuation of the Cl content in a stable process condition is not violent, thereby requiring no requirement or control.

In one aspect, the invention relates to a manufacturing method of a multimode fiber that is disclosed as follows.

A pure quartz glass liner tube is fixed on a PCVD platform to perform doped deposition. A fluorine-containing gas is input into reaction gases $SiCl_4$ and $O_2$ to incur F-doping, and $GeCl_4$ is input to incur Ge-doping. The reaction gases in the liner tub are ionized into ions through microwaves, and are finally deposited in the form of glass on an inner wall of the liner tube. According to doping requirements of a waveguide structure of the fiber, the flow of the doping gas in the mixed gas is changed to deposit the claddings and the core in sequence. After the deposition is completed, an electric heating furnace is used to fuse and shrink the deposited tube into a solid core rod. Partial corrosion is performed on the core rod by using HF according to needs, and then the synthesized pure quartz glass or F-doped quartz glass is used as a sleeve to produce a fiber preform rod by adopting an RIT process, or to produce a fiber preform rod by depositing the outer cladding outside the core rod by adopting an outside vapor deposition (OVD) or vapor axial deposition (VAD) outside cladding deposition process. The fiber preform rod is placed in a drawing tower to produce the fiber by drawing. Two layers of ultraviolet-ray-curable polyacrylic resin are coated on a surface of the fiber.

In one embodiment, the fluorine-containing gas is any one or more selected from $C_2F_6$, $CF_4$, $SiF_4$, and $SF_6$.

In one embodiment, at the wavelength of 850 nm, the fiber has a bandwidth of 200 MHz-km or over 200 MHz-km. In another embodiment, at the wavelength of 850 nm, the fiber has the bandwidth of 500 MHz-km or over 500 MHz-km. A numerical aperture of the fiber is in a range of 0.29 to 0.33. In one embodiment, at the wavelength of 1300 nm, the fiber has the bandwidth of 200 MHz-km or over 200 MHz-km. In another embodiment, at the wavelength of 1300 nm, the fiber has the bandwidth of 500 MHz-km or over 500 MHz-km.

For the fiber of the present invention at the wavelength of 850 nm, a bending loss resulted by winding the fiber two turns at a bend radius of 7.5 millimeters is less than or equal to 0.35 dB; the bending loss resulted by winding the fiber two turns at the bend radius of 15 millimeters is less than or equal to 0.2 dB; and the bending loss resulted by winding the fiber 100 turns at the bend radius of 30 millimeters is less than or equal to 0.2 dB.

The present invention has the following advantages. 1) The fiber having a large core diameter and a specific waveguide structure is designed, so as to further increase the bandwidth and the numerical aperture of the multimode fiber, thereby greatly improving the light gathering capability of the fiber and facilitating coupling to an LED light source. 2) A trench cladding is disposed outside the core of the fiber, thereby significantly decreasing macro bending generated attenuation of the fiber and improving bending resistance performance of the fiber. 3) The present invention has a reasonable structural design, desirable service performance, and a simple and convenient manufacturing method, further decreases configuration costs of a LAN while improving optical power transmission and optical data transmission, and is applicable to large-scale production and promotion.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DESCRIPTION OF EMBODIMENTS OF THE INVENTION

Figure 1:
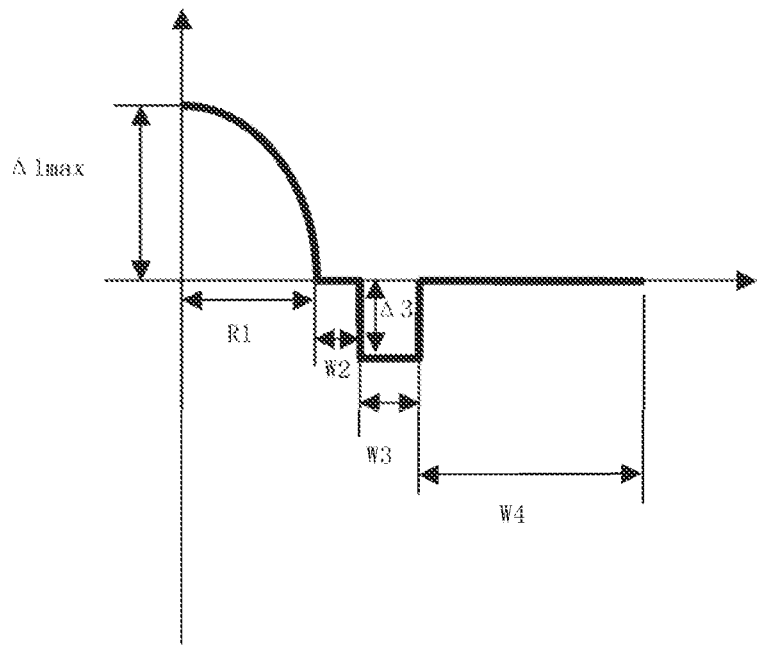
FIG. 1 is a schematic view of a refractive index profile of a fiber according to an embodiment of the present invention.

The present invention is more particularly described in the following examples that are intended as illustrative only since numerous modifications and variations therein will be apparent to those skilled in the art. Various embodiments of the invention are now described in detail in conjunction with the accompanying drawings. Referring to the drawings, like numbers indicate like components throughout the views.

In accordance with the purposes of this invention, as embodied and broadly described herein, this invention, in one aspect, relates to bending-resistant large core diameter high numerical aperture multimode fiber.

Tests of a macro bending generated loss and an overfilled launch bandwidth in the embodiments are illustrated below.

The macro bending loss is measured according to the FOTP-62 (IEC-60793-1-47) method. A fiber under test is wound into n turns/circles at a diameter (such as 15 mm, 20 mm, and 30 mm), and then the turns/circles of the fiber are released, so as to test the changes of optical power before and after the winding, which is used as the macro bending loss of the fiber. During the test, an encircled flux light launch condition is adopted. The encircled flux light launch condition may be obtained through the following method. A common 2-meter-long 50-micron-core-diameter multimode fiber is fused with a front end of the fiber under test, and the middle of the fiber is wound into a 25-millimeter-diameter circle. When overfilled light is launched into the fiber, the fiber under test is encircled flux light launch.

The overfilled launch bandwidth is measured according to the FOTP-204 method, and the test adopts an overfilled launch condition.

Embodiment 1

Figure 3:
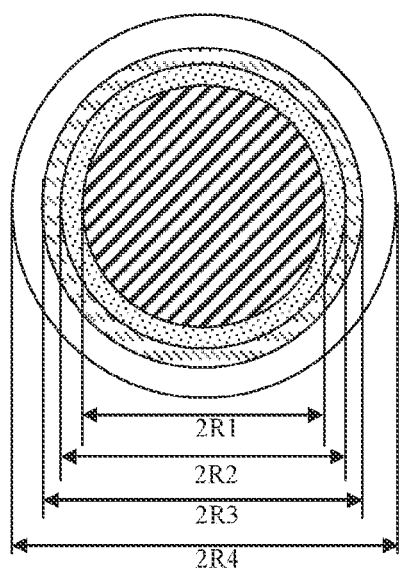
FIG. 3 is a structural view of a radial cross-section of a fiber according to yet another embodiment of the present invention.

The design of a core and claddings of the fiber according to the embodiment is shown in FIGS. 1 and 3. The manufacturing method according to the present invention includes preparing a group of preformed rods and performing drawing at a drawing speed of 600 meter/minute. The structure and main performance parameters of the fiber are listed in Table 1.

TABLE 1 the structure and the performance parameters of the fiber

| | Sample | | | | |
|---|---|---|---|---|---|
| | 1 | 2 | 3 | 4 | 5 |
| Core α | 2.02 | 2.03 | 2.04 | 2.00 | 2.02 |
| Δ1max (%) | 2.232 | 2.230 | 2.230 | 2.229 | 2.236 |
| Δ2 (%) | 0.001 | 0.001 | 0 | −0.001 | 0 |
| Δ3 (%) | −0.489 | −0.50 | −0.51 | −0.505 | −0.48 |
| Δ4 (%) | −0.002 | 0 | 0.001 | 0 | 0.002 |
| R1 (μm) | 30.2 | 30.6 | 40.1 | 48.6 | 39.9 |
| R2 (μm) | 31.7 | 32.1 | 41.6 | 50.1 | 41.2 |
| R3 (μm) | 40.3 | 41.8 | 50.5 | 58.5 | 50.6 |
| R4 (μm) | 62. | 62.5 | 63 | 62.3 | 62.8 |
| Numerical aperture | 0.310 | 0.309 | 0.309 | 0.310 | 0.311 |
| Overfilled launch bandwidth @ 850 nm (MHz-km) | 206 | 211 | 206 | 220 | 218 |
| Overfilled launch bandwidth @ 1300 nm (MHz-km) | 570 | 505 | 514 | 590 | 524 |
| 2-turn 7.5-mm-bend-radius macro bending loss/attenuation @ 850 nm (dB) | 0.222 | 0.225 | 0.200 | 0.231 | 0.218 |
| 2-turn 15-mm-bend-radius macro bending loss/attenuation @ 850 nm (dB) | 0.075 | 0.083 | 0.075 | 0.079 | 0.077 |
| 100-turn 30-mm-bend-radius macro bending loss/attenuation @ 850 nm (dB) | 0.075 | 0.06 | 0.078 | 0.079 | 0.078 |

Embodiment 2

Figure 2:
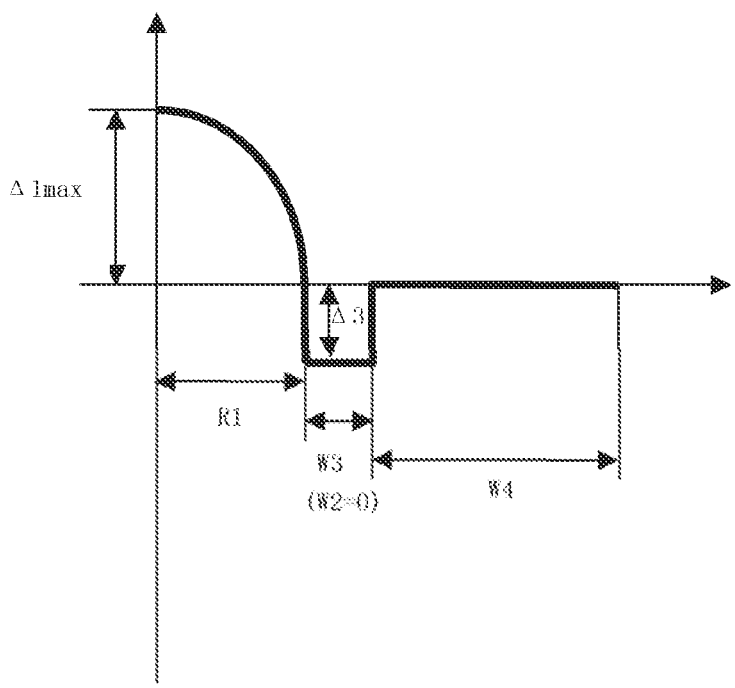
FIG. 2 is a schematic view of a refractive index profile of a fiber according to another embodiment of the present invention.

The design of a core and claddings of the fiber according to the embodiment is shown in FIG. 2. The manufacturing method according to the present invention includes preparing a group of preformed rods and performing drawing at a drawing speed of 600 meter/minute. The structure and main performance parameters of the fiber are listed in Table 2.

TABLE 2 the structure and the performance parameters of the fiber

| | Sample | | | |
|---|---|---|---|---|
| | 6 | 7 | 8 | 9 |
| Core α | 2.13 | 2.12 | 2.11 | 2.13 |
| Δ1max (%) | 2.136 | 2.15 | 2.152 | 2.153 |
| Δ3 (%) | −0.389 | −0.39 | −0.40 | −0.411 |
| Δ4 (%) | −0.002 | −0.001 | 0 | 0.001 |
| R1 (μm) | 35.3 | 40.1 | 45.6 | 47.3 |
| R2 (μm) | 35.3 | 40.1 | 45.6 | 47.3 |
| R3 (μm) | 40.6 | 50.1 | 52.1 | 53.5 |
| R4 (μm) | 62.5 | 63.6 | 64.1 | 62.2 |
| Numerical aperture | 0.295 | 0.304 | 0.305 | 0.305 |
| Overfilled launch bandwidth @ 850 nm (MHz-km) | 211 | 206 | 215 | 218 |
| Overfilled launch bandwidth @ 1300 nm (MHz-km) | 365 | 336 | 312 | 354 |
| 2-turn 7.5-mm-bend-radius macro bending loss/attenuation @ 850 nm (dB) | 0.32 | 0.33 | 0.32 | 0.31 |
| 2-turn 15-mm-bend-radius macro bending loss/attenuation @ 850 nm (dB) | 0.09 | 0.089 | 0.095 | 0.092 |
| 100-turn 30-mm-bend-radius macro bending loss/attenuation @ 850 nm (dB) | 0.10 | 0.11 | 0.11 | 0.15 |

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A bending-resistant multimode fiber with a large core diameter and a high numerical aperture, comprising:
   a core; and
   a cladding surrounding the core;
   wherein a radius R1 of the core is in a range of 28 to 50 microns, a refractive index profile of the core has a parabolic shape, α is in a range of 1.9 to 2.2, and a maximum relative refractive index difference Δ1% max is in a range of 2.229% to 2.5%;
   wherein the cladding comprises an inner cladding and/or a trench cladding, and an outer cladding disposed from the inner to the outer in sequence; and
   wherein the inner cladding has a radius R2 in a range of 28 to 55 microns, and a relative refractive index difference Δ2% in a range of −0.1% to 0.1%, and wherein the trench cladding has a radius R3 in a range of 28 to 60 microns, and a relative refractive index difference Δ3% in a range of −0.15% to −0.8%.

2. The bending-resistant multimode fiber according to claim 1, wherein for the fiber at the wavelength of 850 nm, a bending loss resulted by winding the fiber two turns at a bend radius of 7.5 millimeters is less than or equal to 0.35 dB; the bending loss resulted by winding the fiber two turns at the bend radius of 15 millimeters is less than or equal to 0.2 dB; and the bending loss resulted by winding the fiber 100 turns at the bend radius of 30 millimeters is less than or equal to 0.2 dB.

3. The bending-resistant multimode fiber according to claim 1, wherein the relative refractive index difference Δ3% of the trench cladding is radially constant or radially gradual changed, wherein the gradual change of the relative refractive index difference Δ3% comprises a gradual change in an ascending order from inside to outside or a gradual change in a descending order from inside to outside.

4. The bending-resistant multimode fiber according to claim 1, wherein the core and the claddings are made of Ge-doped, F-doped, Ge—F-doped or pure quartz glass.

5. The bending-resistant multimode fiber according to claim 1, having a bandwidth of 200 MHz-km or over 200 MHz-km at a wavelength of 850 nm.

6. The bending-resistant multimode fiber according to claim 5, having a numerical aperture in a range of 0.29 to 0.33.

7. The bending-resistant multimode fiber according to claim 1, having a bandwidth of 200 MHz-km or over 200 MHz-km at a wavelength of 1300 nm.

8. The bending-resistant multimode fiber according to claim 1, wherein the outer cladding surrounds the trench cladding, wherein a radius R4 of the outer cladding is in a range of 60 to 65 microns, and a relative refractive index difference Δ4% of the outer cladding is in a range of −0.1% to 0.1%.

9. The bending-resistant multimode fiber according to claim 8, wherein the relative refractive index difference Δ3% of the trench cladding is radially constant or radially gradual changed, wherein the gradual change of the relative refractive index difference Δ3% comprises a gradual change in an ascending order from inside to outside or a gradual change in a descending order from inside to outside.

10. The bending-resistant multimode fiber according to claim 8, wherein the core and the claddings are made of Ge-doped, F-doped, Ge—F-doped or pure quartz glass.

11. The bending-resistant multimode fiber according to claim 8, having a bandwidth of 200 MHz-km or over 200 MHz-km at a wavelength of 850 nm.

12. The bending-resistant multimode fiber according to claim 11, having a numerical aperture in a range of 0.29 to 0.33.

13. The bending-resistant multimode fiber according to claim 8, having a bandwidth of 200 MHz-km or over 200 MHz-km at a wavelength of 1300 nm.

14. The bending-resistant multimode fiber according to claim 8, wherein for the fiber at the wavelength of 850 nm, a bending loss resulted by winding the fiber two turns at a bend radius of 7.5 millimeters is less than or equal to 0.35 dB; the bending loss resulted by winding the fiber two turns at the bend radius of 15 millimeters is less than or equal to 0.2 dB; and the bending loss resulted by winding the fiber 100 turns at the bend radius of 30 millimeters is less than or equal to 0.2 dB.

* * * * *